Nov. 13, 1934.  W. J. BAUER  1,980,173
APPARATUS FOR MANUFACTURING TUBULAR MEMBERS
Filed Feb. 27, 1931   6 Sheets-Sheet 1

Inventor
William J. Bauer
By his Attorney

Nov. 13, 1934.  W. J. BAUER  1,980,173
APPARATUS FOR MANUFACTURING TUBULAR MEMBERS
Filed Feb. 27, 1931  6 Sheets-Sheet 4
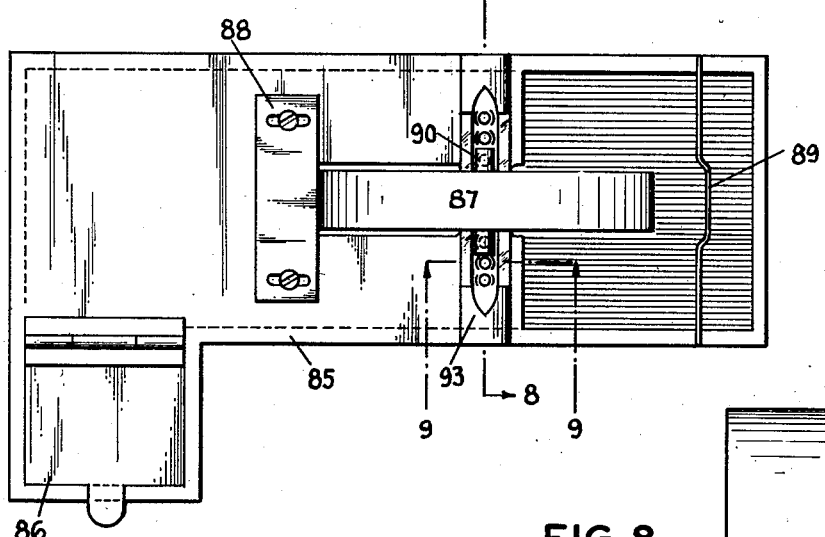
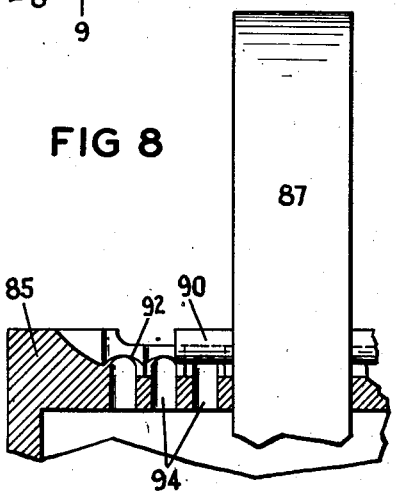
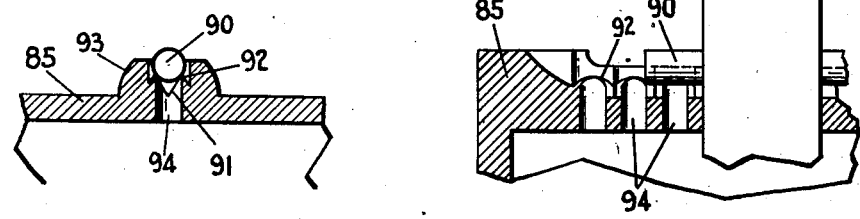
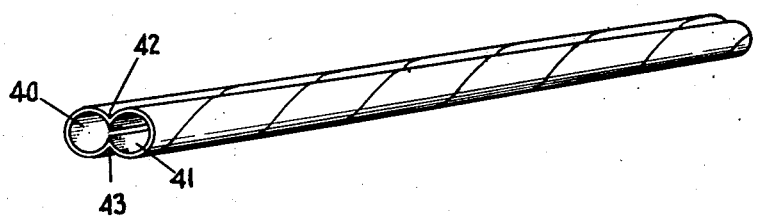
Inventor
William J. Bauer
By his Attorney Nov. 13, 1934.                W. J. BAUER                 1,980,173
APPARATUS FOR MANUFACTURING TUBULAR MEMBERS
Filed Feb. 27, 1931        6 Sheets-Sheet 5

Inventor
William J. Bauer
By his Attorney

Patented Nov. 13, 1934

1,980,173

UNITED STATES PATENT OFFICE 1,980,173

APPARATUS FOR MANUFACTURING TUBULAR MEMBERS

William J. Bauer, Yonkers, N. Y.

Application February 27, 1931, Serial No. 518,654

5 Claims. (Cl. 93—80)

The invention relates to apparatus suitable for manufacturing tubular members such as paper tubes, artificial "straws" or sippers.

It has for an object to manufacture the tubular members continuously from paper or other suitable stock in the form of a narrow tape, providing thereby a tubular member which is, preferably, longitudinally indented or fluted to afford a multiplicity of ducts. Further objects of the invention reside in the provision of novel means for feeding the tape stock in manner to form the same into a continuous tubular member; in the provision of means for longitudinally indenting the tubular member; and in the provision of means for rapidly severing the fluted member to provide tubes of the desired lengths.

Other objects of the invention reside in means for suitably tensioning the tapes during operation, in means to afford a ready mounting of the tape reels and prevent binding of the same as the stock is drawn therefrom, and also in the provision of means for preventing creeping of adhesive along the adhesive-applying roll shaft.

Still another object is to lubricate the surface of the mandrel upon which a tube is being formed to minimize development of heat by friction, and to obviate accumulation of adhesive thereon.

In carrying out the invention, tapes of suitable stock are arranged to be fed at an acute angle to the axis of a mandrel, which mandrel in turn is rotated by a driving band wound about the same and under which band the tapes are located and pass, to be advanced helically along the said mandrel, in overlapping relationship for formation thereby into a tubular member.

One of the tapes, moreover, is coated over its under surface with a suitable adhesive in order suitably to secure the tapes together in their overlapping relationship when wound on the mandrel in the formation of the tubular member.

The far end of the mandrel, moreover, may be tapered to a reduced diameter and suitably shaped if desired to coact with rotatable crimping rolls adapted for longitudinally indenting the tubular member to form thereof a plurality of adjacent longitudinal ducts as said tubular member progresses along the mandrel and through the crimping means.

After leaving the mandrel, the fluted or indented member is guided to suitable means for rapidly severing the same into desired lengths.

Provision is also made for preventing overrunning of the tapes and to afford suitable tension thereon.

The nature of the invention, however, will best be understood when described in connection with the accompanying drawings, in which:

Fig. 7 is a plan view of the adhesive-applying roll and tank.

Fig. 8 is an enlarged fragmentary transverse section taken on the line 8—8, Fig. 7 of the drawings.

Fig. 9 is a fragmentary longitudinal section taken on the line 9—9, Fig. 7.

Fig. 10 is a perspective view illustrating the novel straw, as a duplex member.

Figure 1:
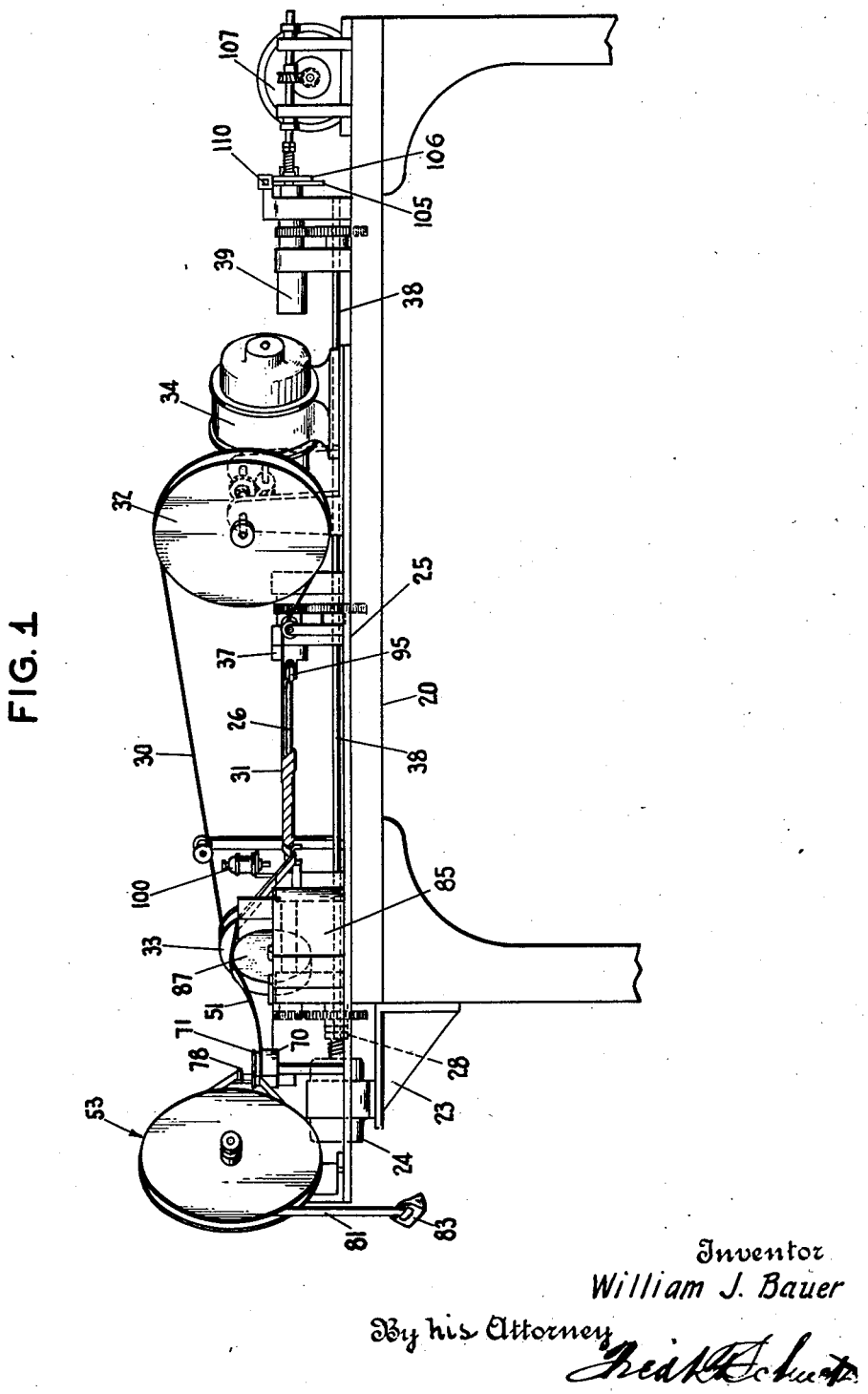
Fig. 1 is a front elevation of the novel machine for manufacturing tubular members such as, for example, multiduct straws.
Figure 2:
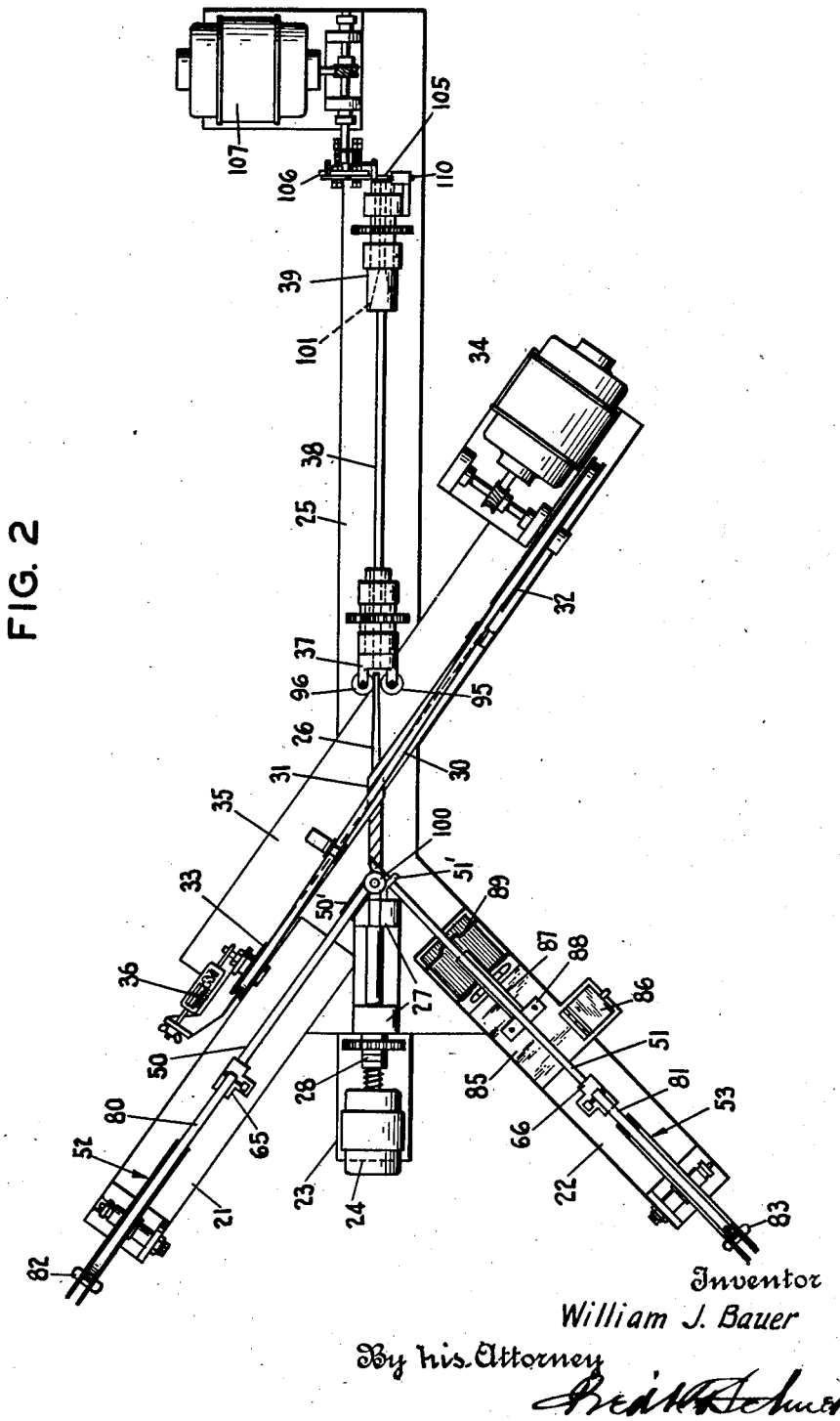
Fig. 2 is a plan thereof.

Referring to the drawings, 20 designates a suitable supporting frame or table upon which the novel mechanism may be mounted, said table having extensions or arms 21 and 22 at one end, and an intermediate bracket 23 adapted to support an electric motor 24. The arms 21 and 22 are located at an acute angle to the top 25 of the table and are designed to support suitable stock-supplying members, stock-tensioning means, and an adhesive-applying device, all of which will be hereinafter more fully set forth.

A longitudinally disposed mandrel 26 is rotatably mounted above the top 25 as in bearings 27, and is driven from the motor 24 through a friction member 28. This mandrel is further arranged to be rotated and governed by means of an endless belt or band 30 having two complete helical turns about the mandrel, as at 31, and is mounted over pulleys 32 and 33. The former pulley is driven by an electric motor 34 which is mounted upon a further arm 35 secured to the table top and supporting also the said pulleys 32 and 33. Arm 35 extends beyond the top 25 in both directions and is parallel to one of the tape-bearing arms as arm 21; and the one pulley 33 is adjustable thereon, a setting scale 36 being provided in connection therewith to facilitate retensioning of the band after replacement of the tapes of stock.

Mandrel 26 at its far end is tapered to a reduced diameter, which end is associated with suitable crimping or fluting mechanism also mounted upon the table top 25 and having associated therewith a rotatable guide 37 which with said crimping mechanism is driven from motor 24 through intermediate gearing from a shaft 38 mounted over the table top.

This shaft drives also a rotating guide 39 for supporting the length of formed tubing during the severing operation and tends thereby to eliminate friction in the advance of a tubular member or straw length.

The novel multiduct tube as one embodiment of the invention and resulting from these operations is shown more clearly in Fig. 10 of the drawings and may consist, by way of example, of the two substantially tubular ducts 40 and 41. These are produced by the diametrically opposite flutes 42 and 43 provided longitudinally of the tube which, in its original form, was of circular cross-section. It is understood, of course, that I do not wish to be restricted to the number of ducts shown, as the same may be varied in accordance with the longitudinal fluting of the original tubular member, nor to the particular shape of the completed tube which is determined by the shape of the mandrel. Furthermore, if a tube of the usual circular or other cross-section without flutes be desired, the crimping operation may be omitted entirely and the mandrel end modified accordingly.

Figure 3:
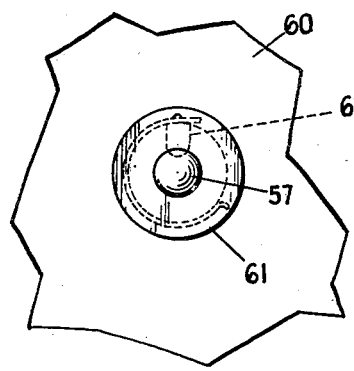
Fig. 3 is a fragmentary end view, and Fig. 4 a fragmentary vertical section illustrating the manner of mounting paper stock reels.
Figure 4:
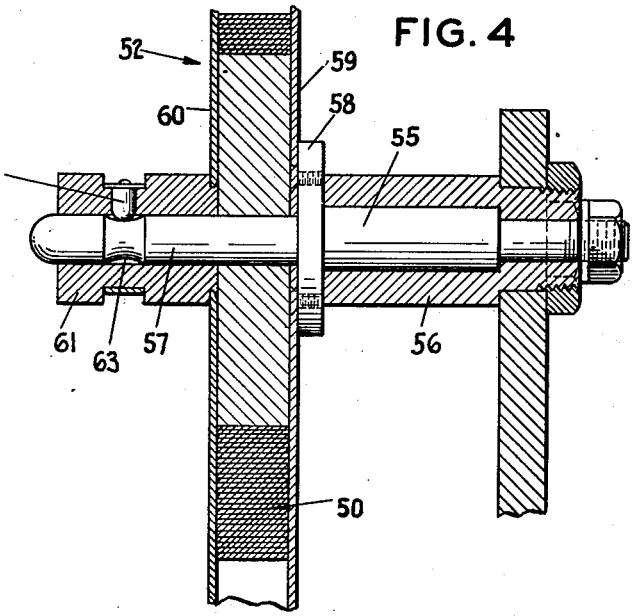

The tubular member to be formed by the aforesaid mechanism is constructed from suitable stock as of paper, and in the form of tapes 50 and 51 mounted on respective reels 52 and 53 which are carried by the corresponding arms 21 and 22. A convenient way of mounting a reel, as the reel 52, is indicated in Figs. 3 and 4 of the drawings, and which admits of ready removal of an empty spool and replacement. As shown, a spindle 55 is rotatably mounted in bearing 56 and is provided with a reduced-diameter outer portion 57 and an intermediate flange or shoulder 58. This spindle 55 is therefore free-running and the spool or reel 52 is also mounted to rotate freely upon its outer reduced portion 57. A circular wall or disk 59, for confining the reel, is to this end rigidly secured to flange 58 and a further circular wall or disk 60 is adapted to be fitted over the reduced portion 57 to hold the reel in position and confine the stock.

The said disk 60 in turn, and thereby the reel, is located and held on the reduced portion 57 by means of a nut 61 attached to wall 60 and removably fitted over the outer end of said reduced portion. The said nut, furthermore, is yieldingly held thereto by a spring-pressed pin 62 fitting a peripheral groove 63 of the reduced portion.

Thus, not only is the reel properly and securely located on its spindle but replacement is readily and quickly effected, which is particularly desirable as the stock of the reels is consumed very rapidly in the operation of manufacturing the straws. Furthermore, the stock from the reels will readily be drawn therefrom in that not only is the said reel freely rotatable on the reduced portion 57 of the spindle, but said spindle itself is freely rotatable in its bearing and any binding action of the tape is obviated.

Figure 5:
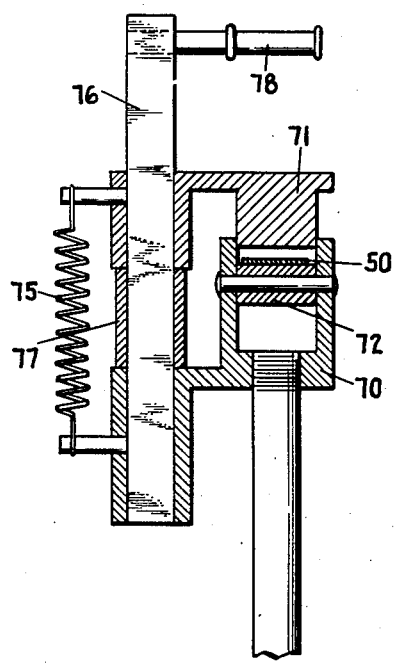
Fig. 5 is a vertical section, and Fig. 6 a transverse section illustrating tensioning means for a tape.
Figure 6:
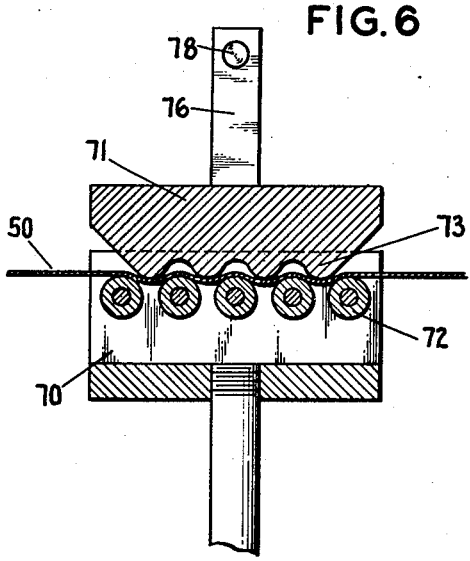

Provision is made, also, for exerting a predetermined tension upon the outgoing tapes; and to this end respective tensioning devices 65 and 66 are mounted upon each of the arms 21 and 22 between a corresponding reel and the mandrel. Such device, reference being had to Figs. 5 and 6 of the drawings, comprises a pair of jaw members 70 and 71. The former carries a plurality of horizontally disposed rollers 72 and is stationary, while the latter is movably mounted vertically with respect thereto and has a series of intermediate projections 73 bearing upon a tape 50 passing between the said jaws. As stated, jaw 71 is movable and is urged toward the jaw 70 as by means of a spring 75 secured therebetween, jaw 71 being guided upon a vertically disposed bar 76. An intermediate sleeve 77, mounted about the bar 76 between the upper and lower jaws, determines the extent of downward movement of jaw 71 and thus limits the tension which may be exerted upon the tape. Bar 76 carries also at its upper end a fastening arm 78.

Provision is made, furthermore, to prevent over-running of the reels as by means of respective bands 80 and 81 secured at one end to a fastening arm 78 of the corresponding tensioning devices 65, 66. A said band then passes over the top of a reel to hang down over the back thereof and carries a suitable weight 82 and 83, respectively.

One of the tapes, as the tape 51 before reaching the mandrel 26, is arranged to have applied to its undersurface a suitable adhesive which may be contained in a storage tank 85 with filling opening 86 and mounted upon the arm 22. Into this tank dips a roller 87 engaging at the entrance portion with a scraper 88 and at its exit end the tank is provided with a scraper 89 for the tape so that any surplus adhesive is removed first from the applying roll 87 and then from the outgoing tape, it being understood that the tape passes over the surface of the roller to have the adhesive applied to its underside.

Provision is made, also, to prevent the adhesive from the roll creeping beyond the shaft 90 upon which the roll is mounted. To this end, the shaft is arranged to rest in a V-shaped open bearing 91 which at the lowermost portion is set back slightly to form an edge 92 for scraping the surface of the spindle and thus free the same of any adhering adhesive. Bearing 91 is provided in a transverse bar 93 which is slotted immediately below the shaft 90, as at 94, so that any adhesive scraped from the shaft will be returned to the tank 85 below the same.

The tape 51 with adhesive thus applied to its undersurface is brought over the mandrel while the tape 50 is brought under the mandrel and both are wrapped helically over the same with overlapping edges and are then both brought under the band 30 which rotates the said spindle in addition to the rotative effect derived from motor 24. A guide 50' and a guide 51' for the respective tapes and located just ahead of the mandrel serve to direct the said tapes properly to the said mandrel.

By this expedient, the two tapes are wound into a tubular form on the rotating mandrel 26; and the correct speed of the band for effecting the union of the two tapes through the action of band 30 may be obtained by building up of the circumference of pulley 32 and proper adjustment of the pulley 33 slightly toward and away from pulley 32 so as to correspondingly tension the band 30. After once having determined the required tension, a band may be replaced readily in case of breakage to the same tension by reference to the scale 36.

It is desirable, also, to apply a lubricant to the mandrel as by means of the drip lubricator 100 which is located above the mandrel 26 immediately in advance of the introduction of tape 51 thereover. The application of this lubricant to the mandrel not only serves to prevent retardation in the advance of the tapes thereon but also prevents the accumulation of adhesive on the mandrel.

Figure 11:
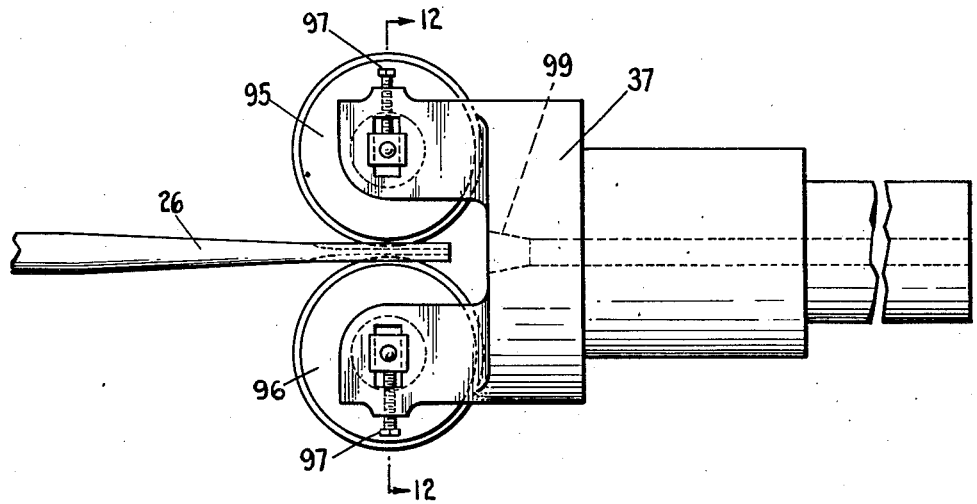
Fig. 11 is a plan view of the crimping or fluting mechanism.
Figure 12:
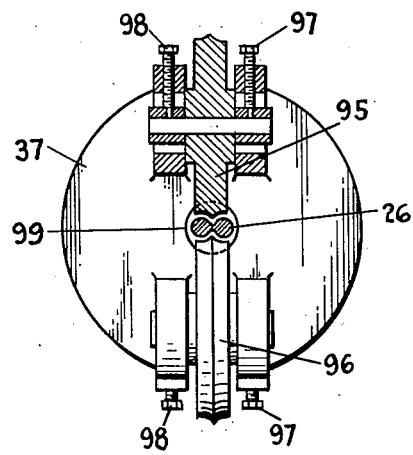
Fig. 12 is a part vertical transverse section thereof taken on the line 12—12, Fig. 11.

As the completed tube proceeds along mandrel 26, it eventually reaches the crimping mechanism, more particularly shown in Figs. 11 and 12, and at which the mandrel is tapered to a reduced cross-sectional area and shaped to the form of the desired completed straw. As indicated in these figures, this mechanism comprises a plurality of co-acting grooved rolls 95 and 96, designed to indent or flute longitudinally the tubular member as it is fed thereto along the mandrel and form the tube into a multiduct straw, for example, of the nature of the duplex straw indicated in Fig. 10. The bearings for these coacting rollers are made adjustable in usual and well-known manner as by the screws 97 and 98 so that the desired crimping effect may be obtained.

The rolls 95 and 96, furthermore, are rotatable bodily about the axis of the mandrel to conform to the rotation of the tubular member advancing along said mandrel, the rotational movement being communicated to the said rolls from shaft 38 through intermediate gearing and timed to the rotation of the said mandrel.

After leaving the far end of the mandrel the tubular member which may constitute a "sipper" or artificial "straw" in its multiduct form passes into the mouth 99 of the rotatable guide 37. Further along the top 25 it is received in the mouth 101 of the additional guide 39 also rotated from motor 24 through the shaft 38 and intermediate gearing.

Figure 13:
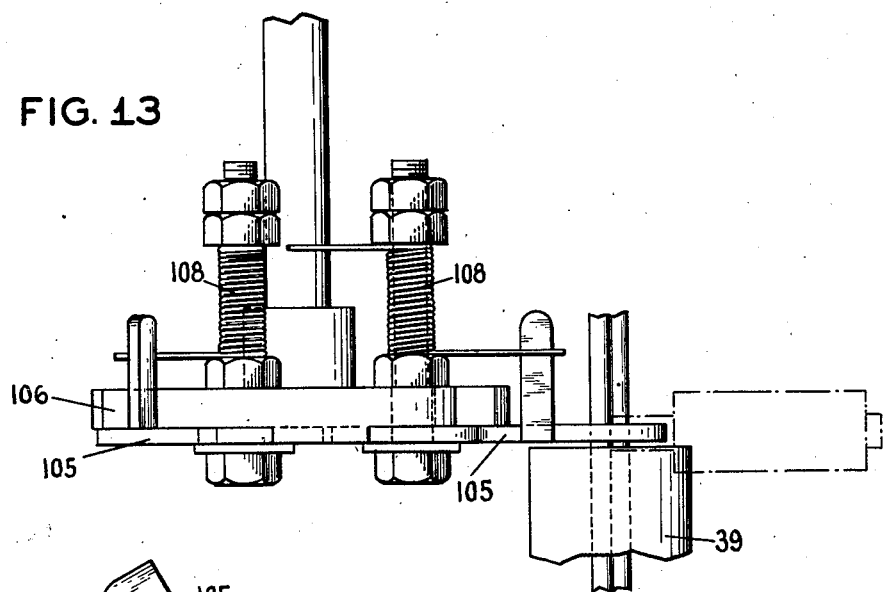
Fig. 13 is a plan view.
Figure 14:
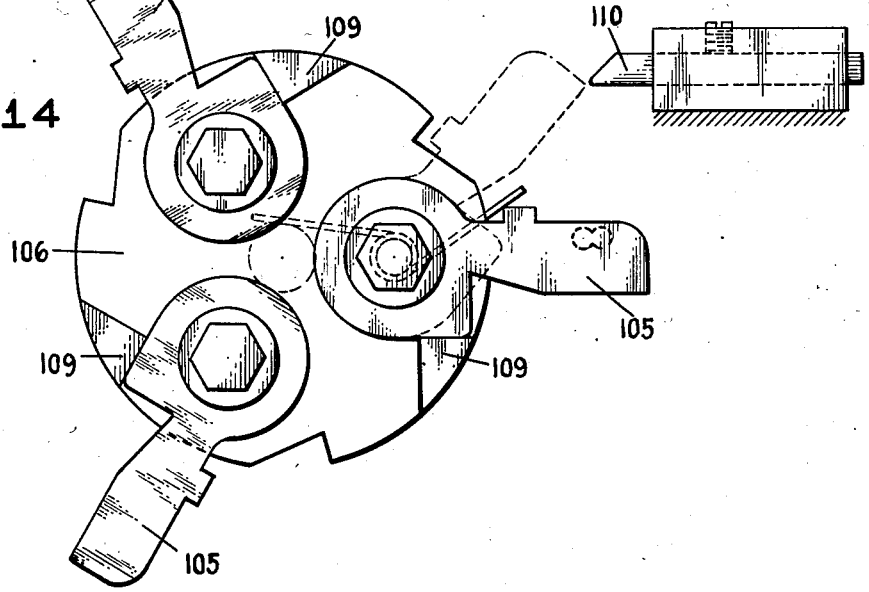
Fig. 14 is an end elevation illustrating the severing mechanism for cutting the straws into suitable lengths.

As the completed straw emerges from the far end of guide 39 provision is made to sever projecting portions thereof of predetermined length by means of a plurality of oscillatable knife blades or rather breaker bars 105, Figs. 13 and 14, which are mounted eccentrically upon a rotatable disk 106 driven from a motor 107. These blades are mounted for angular movement relatively to their carrying disk 106 and are spring-urged in the direction of rotation by blade springs 108 bearing thereon, the movement in the direction of the spring effect being limited by stops 109 of the disk with which the arms engage normally.

A blade or bar is designed to be temporarily drawn backwardly in opposition to its corresponding spring and then suddenly released for cutting off a straw length, and operates with the full force of the said spring acting to effect said operation. A finger 110 to this end is adjustably associated with the blades and is designed to project into the path of their rotation (Fig. 14), whereby, and depending upon the relative location of the finger and blades, a said blade will be drawn backwardly, as indicated by the dotted line position, Fig. 14, to a predetermined extent as the disk 106 rotates.

A considerable force is thereby stored up in the blade and when it eventually clears the finger 110, this force will be released to effect a sudden and quick movement of the blade to cut off a predetermined length of the finished straw. Depending upon the position of finger 110 relatively to said blades, the force of the cut may be varied, as required. By rotating the guide 39, in presenting a straw length to the severing mechanism, the advance of the finished straw is not appreciably retarded through friction and a better severing action also is attained. The novel arrangement embodying a multiplicity of blades for severing the straw lengths admits of exceedingly rapid operation so that the feed along the mandrel may be had at a high rate, and a large output in a relatively short period is attained.

I claim:

1. Apparatus for manufacturing tubular members from a pair of tapes, comprising a frame, a mandrel rotatably mounted thereon, a pair of tape supplying means to supply a pair of tapes at an angle to the mandrel, a driving band helically wound about the mandrel to rotate the same and to advance along the mandrel the tapes which are located under said band and in overlapping relationship, and the said mandrel being reduced at its far end and fluted longitudinally to conform to the desired final form of the tubular member, and rotatable crimping rolls having a circumferential ridge conforming to the said mandrel end and associated therewith to flute longitudinally a tubular member.

2. Apparatus for manufacturing tubular members from a pair of tapes, comprising a frame, a mandrel rotatably mounted thereon, a pair of tape supplying means to supply a pair of tapes at an angle to the mandrel, a driving band helically wound about the mandrel to rotate the same and to advance along the mandrel the tapes which are located under said band and in overlapping relationship, and the said mandrel being reduced at its far end and fluted longitudinally to conform to the desired final form of the tubular member, rotatable crimping rolls having a circumferential ridge conforming to the said mandrel end and associated therewith to flute longitudinally a tubular member, and means located beyond the crimping rolls to sever the tubular and crimped member into desired lengths.

3. Apparatus for manufacturing tubular members from a pair of tapes, comprising a frame, a mandrel rotatably mounted thereon, a pair of tape supplying means to supply a pair of tapes at an angle to the mandrel, a driving band helically wound about the mandrel to rotate the same and to advance along the mandrel the tapes which are located under said band and in overlapping relationship, and the said mandrel being reduced at its far end and fluted longitudinally to conform to the desired final form of the tubular member, crimping rolls having a circumferential ridge conforming to the said mandrel end and associated therewith to flute longitudinally a tubular member, and means to guide the tubular member beyond the crimping rolls and rotatable therewith.

4. Apparatus for manufacturing tubular members from a pair of tapes, comprising a frame, a mandrel rotatably mounted thereon, a pair of tape supplying means to supply a pair of tapes at an angle to the mandrel, a driving band helically wound about the mandrel to rotate the same and to advance along the mandrel the tapes which are located under said band and in overlapping relationship, and the said mandrel being reduced at its far end and fluted longitudinally to conform to the desired final form of the tubular member, crimping rolls having a circumferential ridge conforming to the said mandrel end and associated therewith to flute longitudinally a tubular member, means to guide the tubular member beyond the crimping rolls and rotatable therewith, means located beyond the crimping rolls to sever the tubular and crimped member into desired lengths, and rotatable means to guide the tubular member to the severing means.

5. Apparatus for manufacturing tubular members from a pair of tapes, comprising a frame, a mandrel rotatably mounted thereon, a pair of tape supplying means to supply a pair of tapes at an angle to the mandrel, tensioning means for the respective tapes, a driving band helically wound about the mandrel to rotate the same and to advance along the mandrel the tapes which are located under said band and in overlapping relationship, and additional means for positively rotating the said mandrel.

WILLIAM J. BAUER.